No. 845,214. PATENTED FEB. 26, 1907.
E. L. BAZIN.
APPARATUS FOR UTILIZING THE VIS VIVA OF SEA WAVES.
APPLICATION FILED DEC. 21, 1905.

3 SHEETS—SHEET 1.

No. 845,214. PATENTED FEB. 26, 1907.
E. L. BAZIN.
APPARATUS FOR UTILIZING THE VIS VIVA OF SEA WAVES.
APPLICATION FILED DEC. 21, 1905.

3 SHEETS—SHEET 2.

No. 845,214. PATENTED FEB. 26, 1907.
E. L. BAZIN.
APPARATUS FOR UTILIZING THE VIS VIVA OF SEA WAVES.
APPLICATION FILED DEC. 21, 1905.

3 SHEETS—SHEET 3.

Witnesses

Inventor:
Eugene Louis Bazin
By Wm E Boulter
Attorney.

UNITED STATES PATENT OFFICE.

EUGÈNE LOUIS BAZIN, OF NANTES, FRANCE.

APPARATUS FOR UTILIZING THE VIS VIVA OF SEA-WAVES.

No. 845,214.

Specification of Letters Patent.

Patented Feb. 26, 1907.

Application filed December 21, 1905. Serial No. 292,875.

*To all whom it may concern:*

Be it known that I, EUGÈNE LOUIS BAZIN, a citizen of the French Republic, and a resident of 3 Rue de Brea, Nantes, France, have invented certain new and useful Improvements in Apparatus for Utilizing the Vis Viva of Sea-Waves, of which the following is a specification.

The invention relates to a device for utilizing the vis viva of the sea-waves; and the invention is characterized by the fact that the rising waves are allowed, by reason of the increase of their initial speed, to rise to a certain height in conical conducting-pipes and arranged obliquely, the mass of water being utilized at once or stored in vessels with a view of later utilization, it being possible to facilitate the rise of the water by compressed-air reservoirs and to allow by means of a suitable device the water which falls back and which has not reached the total height to flow away.

Figure 1:
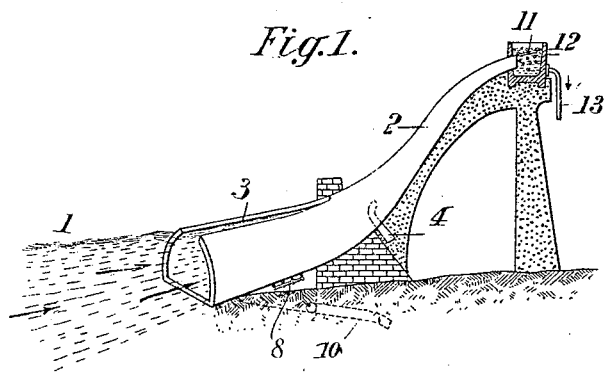
Figure 2:
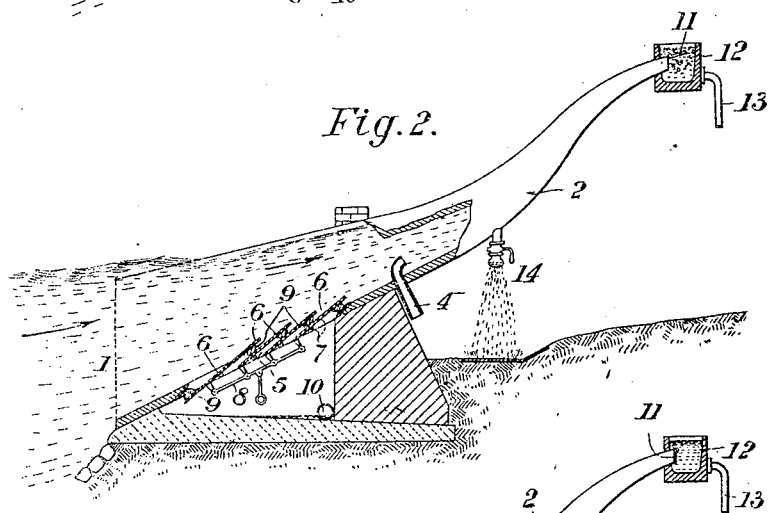
Figure 3:
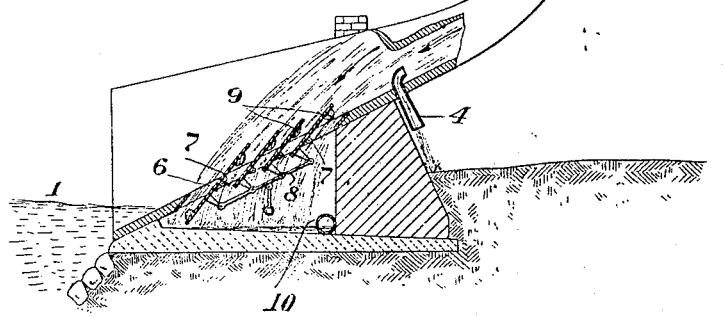
Figure 4:
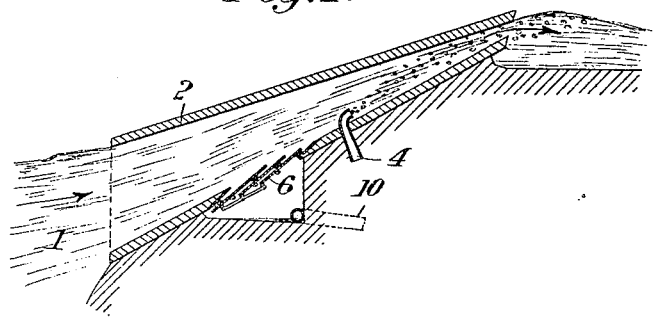
Figure 6:
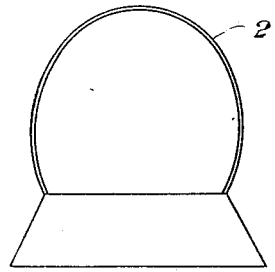
Figure 5:
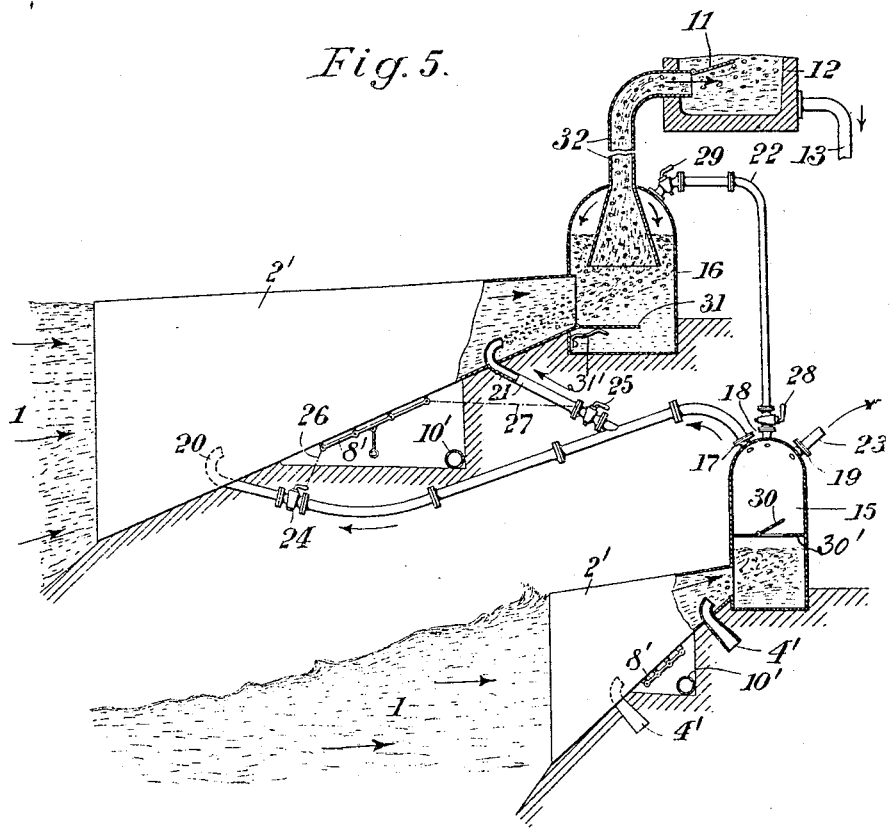

In the annexed drawings, Figure 1 shows a side view of the lifting device with an elevated reservoir shown in section. Fig. 2 shows the same device upon an enlarged scale and in longitudinal section, the liquid being shown as rising, while Fig. 3 is a similar view showing the water as falling. Fig. 4 shows the device without a collecting-reservoir. Fig. 5 shows a combined plant with main reservoir and two smaller reservoirs having the form of air-chambers. Fig. 6 shows the front side of the conical duct.

In Figs. 1 to 4 of the drawings, 1 designates the water entering the conical duct 2 with an undetermined speed. The duct 2 may be left open for a portion of its length, as shown at 3. At a certain point in the height of this duct are located air-inlet pipes 4, with ends curved in the direction of the current and for the object hereinafter described. The pipe 2 is furthermore provided at a certain height with an opening 5, the object whereof will also be presently explained. The closing device is formed of overlapping plates 6, oscillatable upon pivots 7 and which are suitably connected by a rod 8, so that they may be actuated simultaneously. These plates are provided at the points where they come into contact with one another with transverse strips 9, made of any suitable material adapted to insure tightness between the plates when the latter are in the position seen in Fig. 2. 10 is a pipe for the escape of the water. One end of the pipe 2 is provided with a flap-valve 11, or it may be left open, as seen in Fig. 4. 12 is a collector-reservoir, which is provided with an escape-pipe 13.

In Fig. 5, 2' designates the ascending pipes for the water, which pipes, however, in this instance do not directly lead into a reservoir, as 12, but are each connected with an air-chamber 16 and 15, respectively. The air-chamber 15 is connected, as at 17 18 19, with the conduits or pipes 20, 21, and 22. The conduits 20 and 21 lead to the upper conical duct 2', and these pipes may be closed and opened by cocks 24 and 25, which preferably are actuated automatically by means of connecting-rods 26 and 27, while pipe 22 is connected with air-chamber 16 and is provided with cocks 28 and 29. The air-chamber is divided interiorly by means of a partition 30', having a flap-valve 30, into two chambers, the flap-valve opening upward. 4' are the air-inlet pipes of the lower conical duct. The air-chamber 16 of the upper duct can be separated from the latter by means of a flap-valve 31, actuated by a spring 31'. Through the upper side of the air-chamber 15 leads a further cylindrical ascending pipe 32, which is flared like a funnel inside the chamber and extends about to the height of the mouth of pipe 2', while the other end projects into the reservoir 12. 8' indicates the rods for operating the overlapping plates, (not shown in this form,) and 10' are the pipes for escape of the water, being similar to pipes 10 in the first construction. The other arrangements are the same as in Figs. 1 to 4.

The apparatus operates as follows: The water 1 entering the conical duct with undetermined speed has its speed increased by reason of the duct becoming gradually narrower. The liquid is in this manner adapted to attain a certain height, at which it is either stored in a reservoir or fed to the turbine, a water-wheel, or a motor, with a view of being utilized at once. The rise of the water is rendered easier by the above-described air-introducing device 4, through which the water, passing with great speed, carries with it the air, which then mingles with the water and reduces the weight of the latter. In cases where the rising water cannot be entirely caught the covered openings 5 serve to evacuate it, these openings, which allow the rising water to pass without any obstacle and any loss of speed, being opened and conveying to the outside the falling water, so that this mass of water may also be utilized, as above stated, in turbines, motors, water-wheels, and the like.

In special cases a spraying device 14 may be provided on the duct 2 with a view of producing a shower-bath, for instance, for bathers.

The flap-valves 11 serve to prevent the escape of the water stored in the reservoir and close automatically when the upward flow stops.

In Fig. 5 the water flows in the same above-described manner through the conical ducts over the overlapping plates and after having taken up air at 4' is delivered into the air-chamber 15, wherein the air contained in the water is compressed, thus opening the valve 30, so that the air can escape into the upper part of 15. When the cocks 24 25 as well as 28 29 have been opened, the air, on the one hand, escapes through the air-admitting openings 20 21 and at the same time combines with the water entering into the upper conical ducts 2' and, on the other hand, enters the air-chamber 16. The compressed air stored as well in 15 as in 16 produces, on the one hand, a more abundant air absorption of the water rising in the upper duct 2', and consequently a diminution of the weight of the water and a greater speed of the latter, and, on the other hand, exerts pressure on the liquid remaining in the reservoir 16, so that owing to the coaction of these two factors the liquid entering with a high speed from 2' into 16 is adapted to rise correspondingly higher in the cylindrical and vertical duct 32 and to be finally stored in the reservoir 12. The cocks 24 25 of the air-admitting ducts are connected with both ends of the rod 8' by means of connecting-rods 26 27, so that they close automatically when the water flows back and the plates are opened, thus preventing the water penetrating into the air-duct.

The motive power produced by the stored water by means of a turbine, a water-wheel, or a motor can either be used directly or be transmitted to other places by the intermediary of dynamo-engines and the usual current-conducting cable. The electric energy thus produced can be used for metallurgical purposes, for power-transmitting purposes, or otherwise, as well as in the manufacture of hydrogen by decomposition of water. It will be seen from the foregoing that the sea or ocean waves are used for producing waterfalls adapted to furnish great power.

By alternatively retaining and freeing the water of rivers a periodical entrance of this water in the above-described duct can be obtained, whereby the same results, but to a smaller extent, can be realized. Furthermore, several small reservoirs can be filled with water, whereby one always has at one's disposal a falling mass of water when the tide is ebbing.

The ducts and reservoirs can be made of brickwork, reinforced concrete, metal, wood, and the like.

What I claim is—

1. In an apparatus of the character described, the combination with an inclined duct, of an air-admission pipe communicating with the interior of said duct and a collecting-reservoir into which the duct is adapted to discharge.

2. In an apparatus of the character described the combination with an inclined duct tapering from its admission end toward its discharge end as set forth, of an air-admission pipe communicating with the interior of said duct and a collecting-reservoir into which the duct is adapted to discharge.

3. In an apparatus of the character described, the combination with an inclined duct, of an air-admission pipe communicating with the interior of the duct, a collecting-reservoir into which said duct is adapted to discharge, the said duct having an opening in its length through which water is adapted to be discharged, a pipe adapted to conduct away the water discharged through said opening, and means operating to close said opening when water is ascending the duct and to uncover the opening when the water is descending through the duct.

4. In an apparatus of the character described, the combination with an inclined duct, of an air-admission pipe communicating with the interior of the duct, a collecting-reservoir into which said duct is adapted to discharge, the said duct having an opening in its length through which water is adapted to be discharged, a pipe adapted to conduct away the water discharged through said opening, and a plurality of pivoted plates arranged to close the opening when water is ascending the duct and to uncover the opening when the water is descending through the duct.

5. In an apparatus of the character described, the combination with an inclined duct, of an air-admission pipe communicating with the interior of the duct, a collecting-reservoir into which said duct is adapted to discharge, the said duct having an opening in its length through which water is adapted to be discharged, a pipe adapted to conduct away the water discharged through said opening, and a plurality of pivoted plates arranged to close the opening when water is ascending the duct and to uncover the opening when the water is descending through the duct, and means connecting the various plates and adapted to effect simultaneous operation of the same.

6. In an apparatus of the character described, the combination with a plurality of inclined ducts, of an air-admission pipe communicating with the interior of each of said ducts, a collecting-reservoir into which each of said ducts is adapted to discharge, pipes connecting one of said reservoirs and one of the said ducts, a valve arranged in one of said reservoirs, and a valve arranged between the other reservoir and its respective duct, all as and for the purpose set forth.

In testimony whereof I have hereunto set my hand in presence of two witnesses

EUGÈNE LOUIS BAZIN.

Witnesses:
   Louis Goldschmidt,
   Tres Le Meignen.